June 19, 1934.  W. H. PETIT ET AL  1,963,096
PHOTOGRAPHIC FILM STRIP
Original Filed Jan. 20, 1932   2 Sheets-Sheet 1
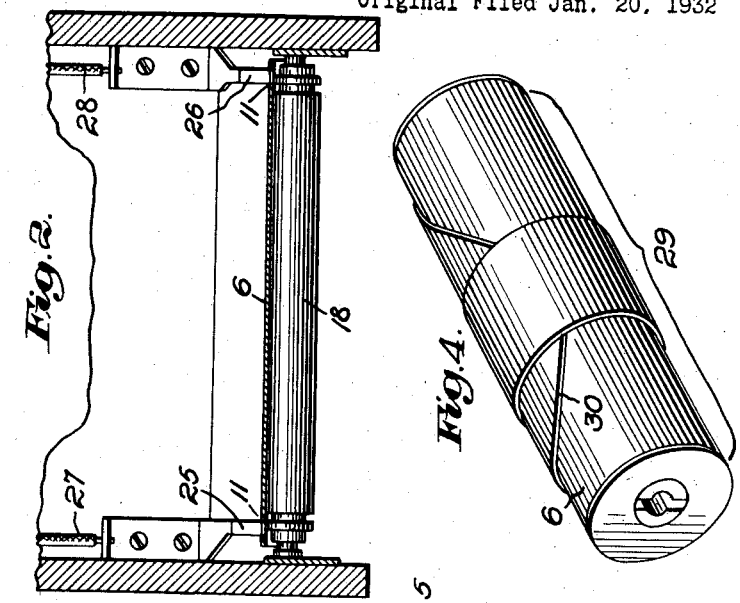
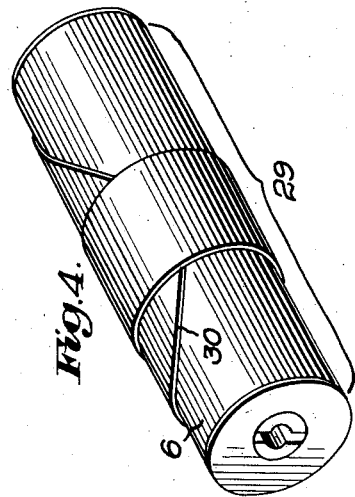
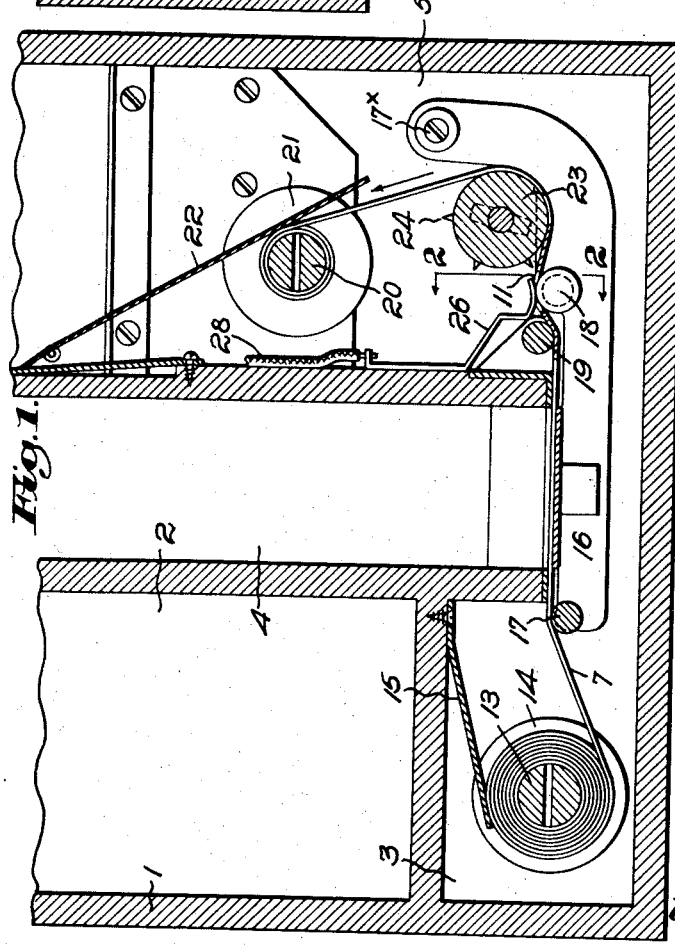
Inventors,
William H. Petit,
Edson S. Hineline
by
Attys.

June 19, 1934. W. H. PETIT ET AL 1,963,096
PHOTOGRAPHIC FILM STRIP
Original Filed Jan. 20, 1932  2 Sheets-Sheet 2
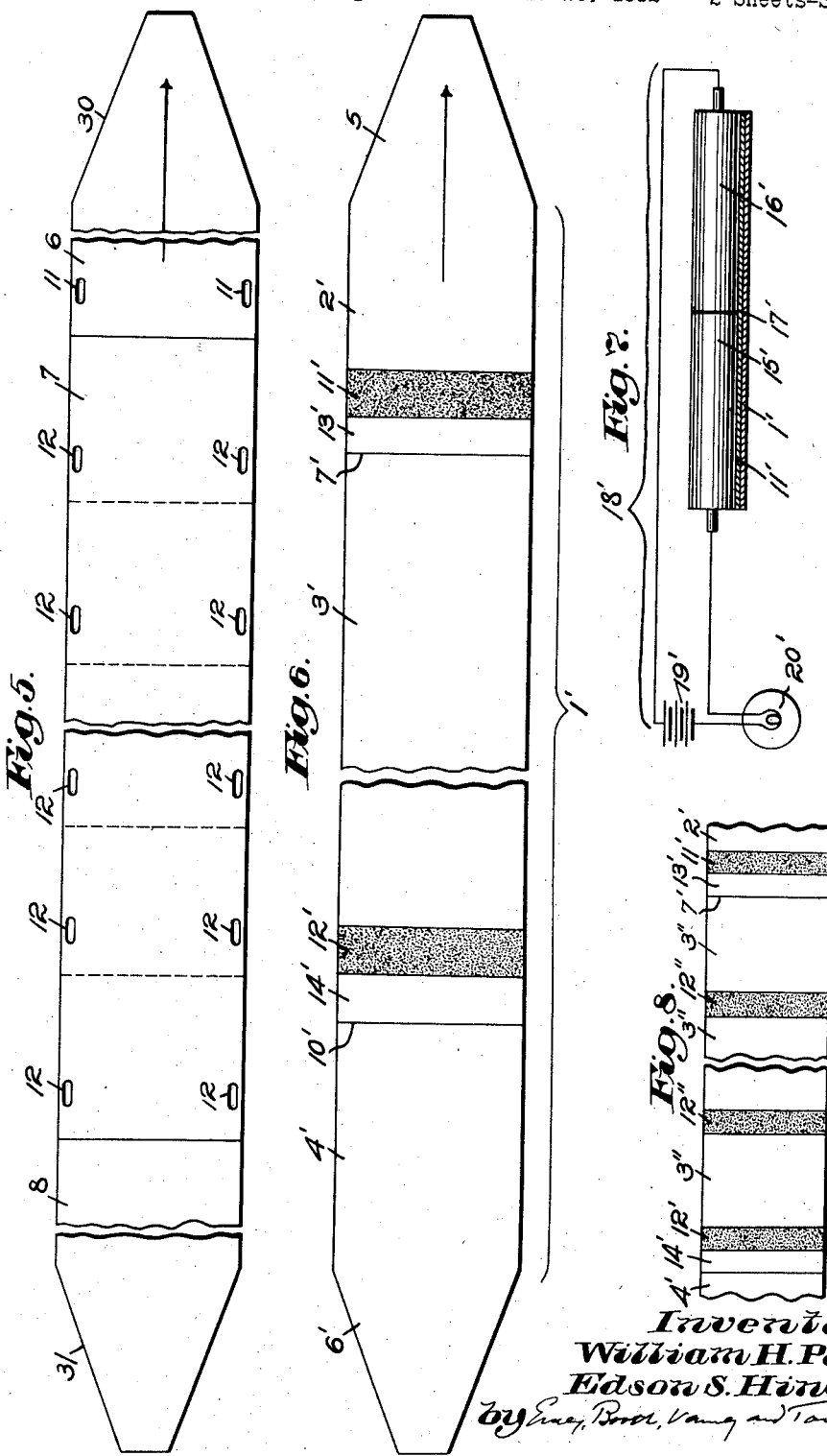
Inventors:
William H. Petit,
Edson S. Hineline,
by
Attys.

Patented June 19, 1934

1,963,096

UNITED STATES PATENT OFFICE 1,963,096

PHOTOGRAPHIC FILM STRIP

William H. Petit, Dayton, Ohio, and Edson S. Hineline, Rochester, N. Y., assignors to Folmer Graflex Corporation, Rochester, N. Y., a corporation of Delaware Consolidated continuation of applications Serial Nos. 587,688 and 587,689, January 20, 1932. This application March 12, 1934, Serial No. 715,107

13 Claims. (Cl. 177—311)

This application is a consolidated continuation, as to common subject-matter, of our two co-pending applications, Ser. Nos. 587,688 and 587,689, filed January 20, 1932.

Our invention relates to photography and more particularly to photographic film strips used in photographic cameras.

In order that the principle of the invention may be readily understood, we have disclosed two embodiments thereof in the accompanying drawings, wherein—

Fig. 1 is a vertical transverse section through the strip, the take-off and take-up spools, the walls or partitions, and other parts of a camera wherein the film strip may be used;

Fig. 2 is a vertical section, upon the line 2—2 of Fig. 1, looking toward the front of the camera;

Fig. 3 is a plan view, with parts broken away, of one form of film strip embodying our invention;

Fig. 4 is a perspective view of the roll or cartridge in its condition before or after exposure;

Fig. 5 is a slight modification of the form of film strip shown in Fig. 3;

Fig. 6 is a plan view, with the central portion broken away, of a second form, type or structure of film strip embodying our invention;

Fig. 7 is a view, partly in transverse section, through the film strip, which view is in part a diagram to illustrate the application of this embodiment of our invention; and Fig. 8 is a plan view, with parts broken away, illustrating a slight modification of such second type of our invention.

The invention particularly relates to flexible photographic films such as formed into strips and wound upon a spool forming a film cartridge for roll-holding cameras, particularly of the automatic type, and the invention has for an important object thereof to provide a film strip to act in the establishment of an electric circuit, to indicate the relation of the sensitive surface to the exposure opening, as, for example, the presentation of the commencement end of the sensitive surface at the said exposure opening, and also the final withdrawal of said sensitive surface from the said exposure opening, or to indicate the position of the film in the camera.

Our invention is therefore particularly adapted for use in a photographic camera which is provided with motor means such, for example, as an electric motor, whereby the film strip may be driven by the motor and the camera may be quickly moved, as by hand, from one object to be photographed to the next of a series, and so on throughout a series of objects, the film strip being moved to present different portions of the sensitive surface during those brief intervals in which the camera is moved from one object to the next.

Such a film strip is provided at one end with a leader end or strip and at the opposite end with a trailer end or strip, both leader and trailer ends being of some opaque substance, such as paper, which ends are not provided with a sensitive surface. The said leader end and trailer end may be integrally formed, or otherwise, with the film strip, but in any case the exposures must not begin until the leader end has passed the exposure opening, and the exposures must cease as the trailer end is reached. It is therefore of extreme importance to provide means for signaling when the exposures may begin and when they must cease, and also as to the position of the film at any time. In accordance with our invention, we have provided means whereby the strip itself acts as a means for controlling an electric circuit. We are aware of the patent to Folmer, No. 1,260,357, March 26, 1918, for a film strip having, near its ends, narrower portions which were provided to control the shutter devices or the film winding devices but which strip was not used as an electric circuit controlling means.

Referring more particularly to the drawings, we have, in Fig. 1, represented a portion of a camera which, while it may be of any desired type, is desirably of the type shown in our co-pending application for Automatic film cameras, Ser. No. 586,919, filed January 15, 1932. Without limiting the invention for use in that particular camera, we will describe the film strip and its function as electric circuit controlling means with reference to that camera.

The lower portion of the body of the camera is represented at 1, it having a motor receiving chamber 2, a take-off spool chamber 3, an exposure tube 4, and a take-up spool chamber 5. While these may be arranged as desired, they are preferably as herein shown. The motor (not shown), which is positioned in the chamber 2, is adapted to be operated from any source of electricity, as, for example, from a circuit in a telephone exchange where the meters of subscribers are to be read, or from any convenient circuit established in proximity to the object or objects to be photographed. Thus, by plugging in at a point provided in the camera, the motor may be operated, and desirably a cycle controlling element will be operated to govern the opening and closing of the shutter and the feeding of the strip.

The camera desirably will be provided with a signal means, such as a red light, to indicate the opening of the shutter, which red light would desirably be under the control of the said cycle controlling element. In accordance with one use of our invention to which we will refer as illustrative merely (but to which use we are not limited), we provide a signal, as, for example, the flashing of a white light, under the control of the film to indicate the instant of the complete passing of the leader end or strip, and also to indicate the completion of the passage of the sensitive surface of the film strip, which, being at once followed by the appearance of the trailer strip, presents a condition when the exposures must cease. So far as we are aware, it has never heretofore been proposed to employ a photographic film strip as an electric circuit controlling means.

Obviously the signaling, or other result from a change in the electric circuit, may be effected from the strip in various ways. In the present application, we have disclosed structural variations at intervals lengthwise the strip for effecting a change in an electric circuit, as, for example, completing the circuit through the white light so that the same is flashed just as the leader strip or end passes beyond the exposure opening, and again just as the trailer strip or end is to be presented. In Fig. 3 the structural variations are provided as openings in the film strip, but our invention, in its broadest aspect, involves any structural variation suitable for the purpose and arranged wherever desired in the strip.

In Fig. 3, wherein the entire film strip with the central portion broken away is best represented, the leader strip, which may be of any suitable character, is indicated at 6, the sensitized film strip at 7 and the trailer strip at 8. These three parts or elements may be of the general character shown in the Folmer patent, or any other suitable character. The line of union between the leader strip and the film strip (that is, the commencement of the sensitive surface) is indicated at 9, and the termination of such sensitive surface is indicated at 10.

Desirably, but not necessarily, just in advance of the line 9 (shown in Fig. 3) there are provided two openings 11 through the film or other structural variation, and desirably just in advance of the line 10 there are provided similar openings 12 or other structural variations. The said openings 11 and 12 may be of any suitable length and area, but should be sufficient to permit the establishment of an electric circuit, as, for example, by the means shown in Figs. 1 and 2. The film strip in the operation of the camera is fed in the direction of the arrow in Figs. 1 and 3 by any suitable means, desirably under the control of the motor referred to, which need not be herein disclosed.

The take-off spool is shown in section at 13, Fig. 1, and is provided with the usual end flanges, one of which is shown at 14. The usual spring finger 15 is provided to exert frictional tension, thereby preventing overrunning. The film strip is suitably threaded, in a manner which need not be fully described, through a gate 16 which is pivoted at 17ˣ in the walls of the camera, so that the said gate may be swung from operative to inoperative position while loading the camera and threading the film. The said gate is provided with idlers 17, 18, over which the film passes, and there is also provided the idler 19 mounted on the exposure opening plate of the camera. The take-up spool is represented in section at 20, it having the usual flanges, one of which is indicated at 21, and there is provided the spring finger 22 for tension purposes.

There may also be provided a roll 23 mounted in the walls of the camera, and about which the film passes in a manner which will be understood.

The electric circuit is completed through the openings 11, 12 and any other openings or at any structural variation, in any suitable manner. For this purpose, we have indicated, in Figs. 1 and 2, contact fingers 25, 26, which are connected to wires 27, 28, extending in a manner which need not be herein more fully described, but which are shown in our co-pending application. The said contact fingers 25, 26 enter the openings 11, 11 and 12, 12 when the same are presented in the feeding of the strip, and the circuit is completed through the metallic idler roll 18.

In Fig. 4, we have indicated as an entirety at 29 the film roll or cartridge having the binder strip secured about the same, the said cartridge being thus rendered light-tight, because of the leader end or strip or the trailer end or strip and the flanges at the ends of the roll.

The leader strip and the trailer strip will, in practice, be secured respectively to the take-off and take-up spools, as by entering the tapered ends 30 and 31 in slots in the spools, and the camera is now ready to be used. If a motor be provided, as referred to and as fully disclosed in one of our said co-pending applications, the camera will be plugged in to an electric circuit in the vicinity of the object to be photographed. Then, upon suitable indication, as, for example, the pressing of a button, the motor is started and functions to feed the strip and to open and close the shutter in cycles. According to one possible use of the camera, the camera will be moved from in front of one object to be photographed to the next adjoining one, and during the brief interval in which the camera is so moved, the cycle element effects the feeding of each exposed area past the exposure opening of the camera, so that the next exposure area is presented. The function of the film as an indicating device or element occurs, as already stated, by the flashing of the white light just as the leader end or strip passes the exposure opening, and again just as the end of the sensitive surface passes the exposure opening. In other uses of the invention, the change in the electric circuit may be used to cause the functioning of members or parts of the camera, etc.

Within the broad scope and purpose of our invention, it is to be understood that the signal could be made (that is, the white light could be flashed) to indicate each presentation of an exposure area. This might be desired in some cases, and, if so, there would be structural variations, as, for example, openings like 11 positioned at the proper point just in advance of each new exposure area. Such construction is shown in Fig. 5, wherein the same reference characters are employed, the openings 11 occurring in the leader strip and the openings 12 occurring in the sensitized portion of the film at substantially the position of each new exposure area.

We are aware that prior to our invention, it has been proposed, in connection with motion picture mechanism, to employ a developed film having a notch or the like at an edge of the film to produce changes in an electric circuit upon a screen. We are also aware that prior to our invention it has been proposed to utilize the feeding openings of a developed moving picture film to make and break circuits for controlling electric lamps, so as to render the pictures from the film on the screen more realistic. We are also aware that a music sheet of a self-playing musical instrument has been made of conducting material, such as copper, and that the surfaces of said sheet have been insulated, the insulation being removed at desired points to control an electric circuit. We make no claim to such matters.

Our invention comprehends an unexposed light-proof photographic film roll as a closed package adapted for use in a camera wherein the said package is unrolled for exposing successive portions of its surface, and wherein the said film is rewound after exposure into a roll package to be thereafter developed.

In Figs. 6, 7 and 8, we disclose that embodiment of our invention that contemplates the application to a surface of said strip at suitable intervals of a conductor of an electric circuit, to constitute a structural variation.

In accordance with such second embodiment of our invention, we provide by application to the surface of the film at the proper points, for causing a change in an electric circuit for any desired purpose, as, for example, the establishment of a signal, which may be the flashing of a white light to indicate the travel of the strip. Thus it may indicate the instant of the complete passing of the leader strip and also may be used to indicate the completion of the passage of the sensitive surface of the film strip, which, being at once followed by the appearance of the trailer strip, presents a condition when the exposure must cease.

Referring more particularly to Figs. 6, 7 and 8, we have indicated the strip generally at 1'. It is provided with a leader strip or end 2', a sensitive surface portion 3', and a trailer strip or end 4', all of which may be of any suitable structure. The leader strip and the trailer strip are respectively provided with tapered ends 5', 6'. The said three parts or elements may be of the general character shown in the said Folmer patent or of any other suitable character. The line of union between the leader strip and the film strip (that is, the commencement of the sensitive surface) is indicated at 7', and the termination of such sensitive surface is indicated at 10'.

Desirably, but not necessarily, just in advance of the line 7', as shown in Fig. 6, there is applied at one surface of the strip an electric conductor 11', and preferably just in advance of the line 10' there is provided a similar electric conductor 12', both of which are of sufficient width in a direction lengthwise of the strip to permit an effective completing of the circuit. Desirably both of said conductors extend the entire width of the strip, though obviously the size and positioning of said conductors may be varied within the scope and purpose of our invention.

Said conductor areas 11', 12' may be of any suitable material adapted for the purpose. We may employ as conductors metallic foil adhesively applied by a flexible cement to a surface of the strip, which surface is preferably the non-sensitive surface of the strip. Our invention, however, is not limited to applying a conductor to the non-sensitive surface as it is possible in certain forms or uses of our invention to apply a suitable electric conductor to the sensitive surface of the strip.

The conductor areas, instead of being a metallic foil, may, for example, be composed of waterproof india ink (that is, an ink having a carbon base), so that it will act as a conductor, or we may employ a metallic powdered paint with a non-insulating binder. Other substances may be employed within the scope of our invention.

The position of the conductor areas 11', 12' is desirably that indicated in Fig. 6, but our invention is in no wise limited to such position. Therein the conductor area 11' is on the leader strip spaced from the line of union 7' by a distance which may be made very slight, as, for example, a little less than the width of one exposure area in a direction lengthwise of the strip. The space indicated at 14' between the conductor area 12' and the line of union 10' with the trailer strip should be of the width of one exposure opening, so that when the signal is made (referring to such use only of our invention) as, for example, the flashing of a white light, it will be realized that there is sufficient sensitive surface left for only one more exposure on that film strip.

Thus we utilize each conductor area upon a surface of the film in this described use of the invention, to provide a signal, as, for example, the flashing of a white light, to indicate the instant of the complete passing of the leader strip 2', and also to indicate the completion of the passage of the sensitive surface 3' of the film strip, it being understood that by this we include the positioning of the conductor strip 12' sufficiently in advance of the line of union 10' with the trailer strip or end 4' as to afford only one more exposure following the flashing of a white light the second time.

The circuit may be established in any suitable manner by means of an applied conductor, such as 11', 12'. For example and as indicated diagrammatically in Fig. 7, we provide a two-part metallic roll 15', 16', the parts of which are insulated from each other, as at 17', and over or under which two-part roll the strip 1' is passed with the non-sensitive surface of the strip next to the said roll so that, when a conductor area 11' or 12' arrives at the roll, the circuit is completed through the two parts 15', 16' of the roll and the conductor area 11'. The circuit is diagrammatically indicated at 18', and includes a battery 19' and a signal light 20'.

In substitution for the signal light 20' or in addition thereto, other means of indicating an electric current may be provided, or we may provide a relay for operating electric circuits, such as solenoids for clutches, electric shutters, counting devices upon the camera, or in fact the completing of the circuit by means of the conductors 11', 12' may be availed of to initiate the performance of any or all of the functions of the camera.

The leader strip or end and the trailer strip or end will in practice be secured respectively to the take-off and take-up rolls, as by entering the tapered ends 5', 6' in slots in the spools, and the camera is now ready to be used. If a motor be provided, as hereinbefore referred to, the camera will be plugged up to a circuit in the vicinity of the object to be photographed and then upon suitable indication, as, for example, by the pressing of a button, the motor is started and functions to feed the strip and open and close the shutter in cycles.

According to one possible use of the camera, to which we refer for convenience of description, the camera will be moved by the user quickly from in front of one object to be photographed to the next adjoining one, and during the brief interval in which the camera is so moved, the cycle element effects the feeding of each exposed area past the exposure opening of the camera so that the next exposure area is presented. The function of the film as an indicating device or element occurs in the disclosed embodiment and use of the invention by the flashing of a white light when the conductor 11' touches the two-part roll 15', 16' (which is substantially just as the commencement of the sensitive surface has arrived in the front of the exposure opening), and again the white light flashes when the conductor 12' arrives at the two-part roll 15', 16' and indicates that but a single exposure area remains on that film.

It is to be understood that within the broad scope and purpose of this use of our invention, the signal could be made to indicate each presentation of an exposure area which might be desirable in some cases, and in such cases there would be a conductor of the character described at the proper point just in advance of each unit exposure area. Such a construction is shown in Fig. 8, wherein the same numerals indicate corresponding parts or formations. However, instead of having a continuous sensitive surface 3', we provide a series of sensitive surfaces 3'', all spaced very slightly apart, and in the intervals between adjacent sensitive surfaces 3'' we place conductors 12'' which, in character, may be in accordance with the disclosure with respect to Figs. 6 and 7.

We are aware that it has been proposed to employ in connection with a developed moving picture film a metal strip at the edge of the film in order to cause the operation of a warning signal indicating that the end of the film is approaching, and therefore warning the operator of a moving picture exhibition of such fact.

When the structural variation is an opening, we prefer that the opening or openings be wholly bounded by material of the strip, though our invention is not limited to such structure. When the structural variation is an applied conductor, the position, shape and size thereof may be varied as found necessary to accomplish the purposes of our invention.

Having thus described two illustrative embodiments of the invention, it is to be understood that although specific terms are employed, they are used in a generic and descriptive sense and not for purposes of limitation, the scope of the invention being set forth in the following claims.

We claim:—

1. As a new article of manufacture, and for use in a photographic camera provided with an electric circuit, including a pair of contacts, an unexposed, sensitized photographic film strip of sufficient length to provide for a number of exposures in succession, said strip comprising a main portion adapted to be supplied in roll form for unwinding and exposure within a photographic apparatus, said strip having respectively a non-sensitized leader end and a non-sensitized trailer end between which ends occurs the entire sensitive surface of the strip; said strip having a structural variation to cause a change in an electric circuit when, in the unwinding of the film strip in use, said structural variation arrives at the contacts of said circuit.

2. A new article of manufacture in accordance with claim 1, but wherein the said structural variation is an opening in the strip for the said stated purpose of causing a change in an electric circuit in the unwinding of the film strip in use.

3. As a new article of manufacture and for use in a photographic camera provided with an electric circuit and with means in said circuit for flashing a light upon change in said circuit and which circuit has terminals adapted to be rendered operative by the herein specified strip, namely, an unexposed, sensitized, photographic strip of sufficient length to provide for a number of exposures in succession for record purposes, said strip comprising a substantially uniform main strip adapted to be supplied in roll form for unwinding and exposure within a photographic apparatus, said strip having respectively a non-sensitized leader end and non-sensitized trailer end, between which ends occurs the entire sensitive surface of the strip, said leader end, near its terminal part, and the sensitized portion of the strip, near the commencement of the trailer end, each having a structural variation to produce a change in an electric circuit when, in the unwinding of the film in use, said structural variations respectively arrive at contacts of said circuit and indicate the relation of the sensitive surface of the film to the exposure opening of the camera.

4. As a new article of manufacture and for use in a photographic camera provided with an electric circuit and with means in said circuit for flashing a light upon change in said circuit and which circuit has terminals adapted to be rendered operative by the herein specified strip, namely, an unexposed, sensitized, photographic strip of sufficient length to provide for a number of exposures in succession for record purposes, said strip comprising a substantially uniform main strip adapted to be supplied in roll form for unwinding and exposure within a photographic apparatus, said strip having respectively a non-sensitized leader end and non-sensitized trailer end, between which ends occurs the entire sensitive surface of the strip, said leader end, near its terminal part, and the sensitized portion of the strip, near the commencement of the trailer end, each having a structural variation to produce a change in an electric circuit when, in the unwinding of the film in use, said structural variations respectively arrive at contacts of said circuit and indicate the relation of the sensitive surface of the film to the exposure opening of the camera; said strip with its said sensitive surface, said leader and trailer ends and said structural variations, all being wound into a package for sale as an article of manufacture and to be opened and placed in a camera for photographic use.

5. As a new article of manufacture and for use in a photographic camera provided with an electric circuit and with means in said circuit for flashing a light upon change in said circuit and which circuit has terminals adapted to be rendered operative by the herein specified strip, namely, an unexposed, sensitized, light-proof, closed, photographic film roll adapted for use in a camera wherein it is unrolled for exposing successive portions of its surface and wherein it is rewound after exposure into a rolled package to be thereafter developed, said film having a leader end and a trailer end, the surfaces whereof are unsensitized, said leader end, near its transverse line of union with the commencement of the sensitized surface of the film, having a structural variation to produce a change in an electric circuit in the unwinding of the film, and the said strip having in the sensitized surface thereof near its transferse line of union with the trailer end a structural variation to produce a change in said electric circuit, whereby the change in the electric circuit may cause a light to flash indicating to the user of the camera when he may commence and when he must cease to make exposures upon the said film.

6. As a new article of manufacture and for use in a photographic camera provided with an electric circuit and with means in said circuit for flashing a light upon change in said circuit and which circuit has terminals adapted to be rendered operative by the herein specified strip, namely, an unexposed, sensitized, photographic strip of sufficient length to provide for a number of exposures in succession for record purposes, said strip comprising a substantially uniform main strip adapted to be supplied in roll form for unwinding and exposure within a photographic apparatus, said strip having respectively a non-sensitized leader end and non-sensitized trailer end, between which ends occurs the entire sensitive surface of the strip; said leader end, near its terminal part having a structural variation to produce a change in an electric circuit when, in the unwinding of the film in use, said structural variation arrives at a contact of said circuit and indicates the relation of the sensitive surface of the film to the exposure opening of the camera.

7. A new article of manufacture in accordance with claim 1, but wherein the said structural variation is a conductor of an electric circuit applied to a face of the strip to cause a change in an electric circuit in the unwinding of the film in use.

8. A new article of manufacture in accordance with claim 1, but wherein the strip has a plurality of structural variations spaced lengthwise the strip for the purpose of causing a change in an electric circuit in the unwinding of the film strip in use.

9. A new article of manufacture in accordance with claim 1, which article is wound into a closed package for sale, to be thereafter opened and placed in a camera for photographic use and to be thereafter developed.

10. A new article of manufacture in accordance with claim 1, but wherein the strip has a plurality of structural variations spaced lengthwise the strip for the purpose of causing a change in an electric circuit in the unwinding of the film strip in use, said structural variations consisting of openings.

11. A new article of manufacture in accordance with claim 1, but wherein the strip has a plurality of structural variations spaced lengthwise the strip for the purpose of causing a change in an electric circuit in the unwinding of the film strip in use, said structural variations consisting of applied electrical conductors.

12. A new article of manufacture in accordance with claim 1, but wherein the structural variation is in the part of the strip near the union line of the sensitized portion with said trailer end of the strip.

13. A new article of manufacture in accordance with claim 1, but wherein there is a structural variation in the said leader end and also a structural variation in the part of the strip near the union line of the sensitized portion with said trailer end of the strip.

WILLIAM H. PETIT.
EDSON S. HINELINE.

CERTIFICATE OF CORRECTION.

Patent No. 1,963,096.   June 19, 1934.

WILLIAM H. PETIT, ET AL.

It is hereby certified that error appears in the printed specification of the above numbered patent requiring correction as follows: Page 4, after line 47, insert the following paragraph:

Other claims, relating to a method of controlling the functions of an automatic or partially automatic camera, are contained in our co-pending application Ser. 723,524, filed May 2, 1934.

And that the said Letters Patent should be read with this correction therein that the same may conform to the record of the case in the Patent Office.

Signed and sealed this 7th day of August, A. D. 1934.

Leslie Frazer (Seal)   Acting Commissioner of Patents.